July 25, 1967 D. B. PRICE 3,332,637
CORD CONTROL MECHANISM
Filed Aug. 2, 1965
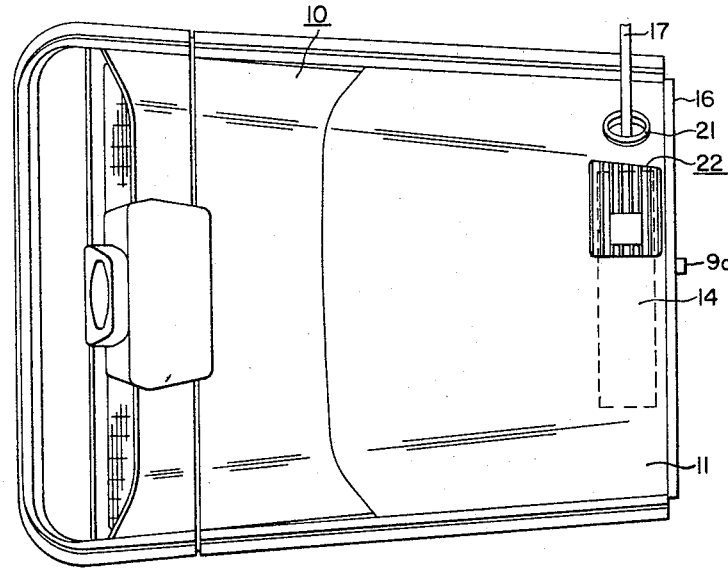
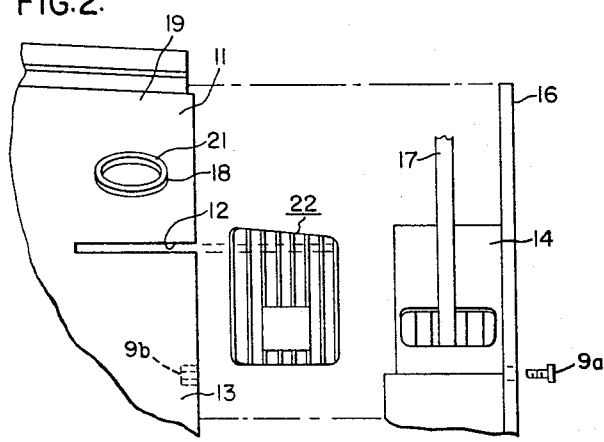
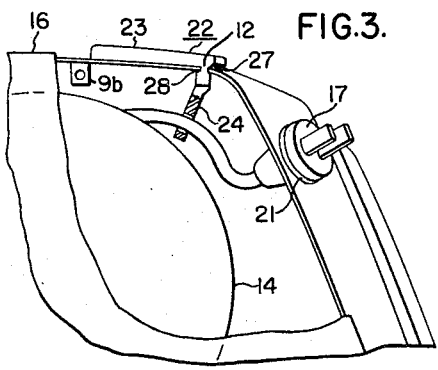
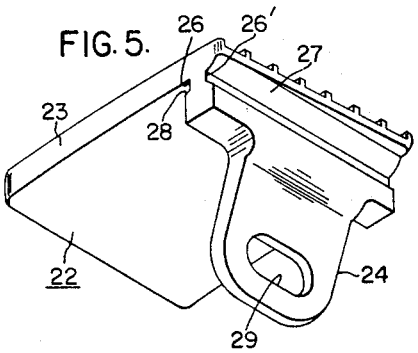
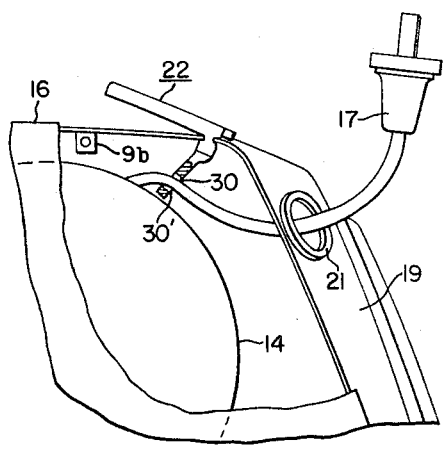
WITNESSES
Theodore F. Wrobel
B B Skler, Jr
INVENTOR
David B. Price
BY
Robert T. French
ATTORNEY

United States Patent Office 3,332,637
Patented July 25, 1967

3,332,637
CORD CONTROL MECHANISM
David B. Price, Washington Township, Mansfield, Ohio, assignor to Westinghouse Electric Corporation, Pittsburgh, Pa., a corporation of Pennsylvania
Filed Aug. 2, 1965, Ser. No. 476,527
7 Claims. (Cl. 242—107.2)

This invention relates, in general, to domestic appliances and, more particularly, to appliances having a power cord and a rewind reel therefor.

Automatic or self-winding cord reels are well known expedients used for storing power cords within the casing of household appliances or within a separate housing attached thereto. To ensure wholehearted acceptance of such an arrangement by the consumer it is necessary to provide means for effectively locking the cord in a plurality of extended positions depending on the length of cord required for a specific application. Due to the highly competitive nature of the appliance industry, the decision to incorporate features of the type herein contemplated, depends primarily on the increased cost of the complete device with the added features. In accordance with the foregoing considerations simple and inexpensive means for effectively locking the cord in a plurality of extended positions have been sought throughout the industry, resulting in devices comprising several component parts which usually consist of a biasing spring and fasteners for mounting levers cooperating to hold the cord in the extended position under the influence of the biasing spring.

Accordingly, the primary object of this invention is to provide new and improved means in a household appliance for locking a power cord in various extended positions.

It is a more particular object of this invention to provide a one-piece structure for maintaining a power cord, carried by a self-winding cord reel, in various extended positions.

Another object of this invention is to provide a cord lock for use with the cord of an automatic cord reel which is the ultimate in low cost, simplicity, and reliability.

Still another object of this invention is to provide a cord lock for an automatic cord reel which may readily be incorporated in existing devices.

Briefly the above-cited objects are accomplished by providing, in a vacuum cleaner for purpose of illustration only by means of suitable fasteners, for example, screws 9a which are secured in tabs 9b, a hollow open end housing having an elongated slot in the edge of one wall thereof adjacent the open end. A substantially L-shaped cord lock molded as a one-piece member is positioned in the slot such that one leg thereof lies outside of the housing adjacent the slotted wall while the other leg is disposed within the housing and is provided with an oval-shaped aperture therein for receiving one end of a power cord carried by an automatic or self-retracting cord reel, mounted within the cleaner housing. A cover and means for securing the cover to the housing in registry with the open end thereof are provided, the cover being effective to captivate the cord lock in the slot. The cord may be unwound to different lengths through another wall of the housing complementary with the slotted wall. As the cord is extended it slips unimpaired through the aperture in the leg of the cord lock, however, as the cord starts to retract under the influence of the cord reel bias spring, the cord frictionally engages the wall defining the aperture through which it passes thereby causing the cord lock to be pivoted through a predetermined angle at which point it is effective to maintain the cord in the extended position. Release of the cord is effected by manually pivoting the cord lock to its original position by means of the leg lying outside of the housing.

Further objects and advantages of the invention will become apparent as the following description proceeds and features of novelty which characterize the invention will be pointed out in particularly in the claims annexed to and forming a part of this specification.

For a better understanding of the invention reference may be had to the accompanying drawings in which:

FIGURE 1 is a top plan view of a vacuum cleaner incorporating the invention;

FIG. 2 is an exploded fragmentary view showing the rear cover and the cord lock representing the invention removed from the vacuum cleaner;

FIG. 3 is a fragmentary rear view, partly broken away, of the cleaner shown in FIG. 1, illustrating the inoperative position of a cord lock representing the invention;

FIG. 4 is a view similar to that of FIG. 3, but illustrating the cord lock in its operative position; and FIG. 5 is a perspective view of the cord lock representing the invention.

Referring to the drawings, especially FIGS. 1 and 2, reference character 10 designates generally a domestic appliance, herein illustrated as a vacuum cleaner. The cleaner 10 is of the type commonly referred to as a canister cleaner and comprises an open end housing 11 having an elongated slot 12 in the edge of a top wall 13 adjacent the open end and extending in the direction of the longitudinal axis of the cleaner. Air circulating and dirt filtering means (not shown) disposed within the housing 11 may be of any conventional type since they do not form a part of the invention. Furthermore, it will be understood that while the invention is herein disclosed for use with a vacuum cleaner, its utility is not so limited.

A cord reel 14, herein disclosed as being mounted on or carried by a cover 16 adapted to be secured to the housing 11 in registry with the open end thereof by means of suitable fasteners, for example, screws 9a which are secured in tabs 9b, is provided for automatically retracting a power cord 17 from extended positions thereof when not being used. The cord reel 14 may be of any known construction and may, for example, be of the type shown and described in U.S. Patent No. 2,937,396, issued to J. W. Momberg et al. The cord 17 is fed through a generally circular opening 18 in a side wall 19 of the housing 11. To minimize fraying of the cord sheating, the circular edge of the housing defining the opening 18 is covered with a conventional grommet 21 made from any suitable material, for example, nylon.

A one-piece cord lock 22 molded from any suitable material, for example, nylon, is supported in the slot 12 by the top wall 13 and is retained therein by the cover 16 which abuts the edge of the housing 11 to close off the open end of the slot 12. The lock 22 as best shown in FIGS. 3–5, has a substantially L-shaped configuration comprising a generally horizontal portion or leg 23, which as will be discussed hereinafter, is adapted to manually effect release of the power cord 17 which is frictionally engaged by a substantially vertical portion or leg 24 in a manner to be described below. In the inoperative position (see FIG. 3) the horizontal leg 23 lies outside of and adjacent the top wall 13. To accommodate pivotal movement of the lock 22 within the slot 12, the vertical leg 24 of the lock is provided with a pair of transverse grooves 26 and 26' (see FIG. 5) adjacent the horizontal leg and coextensive therewith. The bottom edge of the horizontal leg 23 is chamfered as indicated at 27 while the vertical leg 24 is chamfered as indicated at 28 to further facilitate pivoting of the lock 22.

The vertical or cord engaging leg 24 is provided with a generally oval-shaped aperture 29 through which passage of the power cord 17 is unimpaired when it is extended to permit use of the cleaner 10 at a point remote from an electrical outlet. However, the slightest movement of the cord brought about by the cord reel spring, in the opposite direction, causes the cord reel 17 to frictionally engage an upper edge 30 and a lower edge 30′ of the wall defining the aperture 29 whereby the legs 23 and 24 are pivoted clockwise as viewed in FIGS. 3 and 4. In the operative position (see FIG. 4), the cord lock 22 along with the spring force of the cord reel is effective to arch or bend the cord 17 to thereby maintain the cord 17 in any of a plurality of extended positions. Disengagement of the cord 17 and the upper edge 30 and lower edge 30′ may be effected by manually depressing the horizontal leg 23 until it resumes its normal, inoperative position (see FIG. 3). In this position the cord 17 will readily pass through the aperture 29 until it has been completely rewound on the cord reel 14 in a well known manner.

While there has been shown and described what is at present considered to be the preferred embodiment of the invention, modifications thereto will readily occur to those skilled in the art. It is not desired, therefore, that the invention be limited to the specific arrangements shown and described and it is intended to cover in the appended claims all such modifications as fall within the true spirit and scope of the invention:

What is claimed is:

1. For use with a household appliance having a hollow housing with a power cord and a cord reel for retracting the cord from an extended position, means for selectively retaining said power cord in extended positions, said means comprising a substantially L-shaped member having horizontal and vertical segments supported by one wall of asid housing and having an opening therein for receiving said power cord, said L-shaped member being provided with grooves coextensive with the junctures of the horizontal and vertical segments thereof for permitting pivotal movement of said L-shaped member with respect to said one wall, said L-shaped member being adapted to be pivoted by said cord from a first position to a second position whereby said cord is held in an extended position, said L-shaped member being manually movable from said second position to said first position to thereby release said cord for retraction by said cord reel.

2. Suction cleaning apparatus having a housing and a power cord for supplying household current to a motor disposed in said housing, means for rewinding said power cord from an extended position, said housing comprising a removable cover providing access to the interior of said housing through an opening therein, said housing being provided with an elongated slot in an edge thereof adjacent said opening, cord holding means insertable into said slot along the longitudinal axis thereof, said cord locking means including means to prevent withdrawal thereof in directions other than along the longitudinal axis of said slot, means for securing said cover in place thereby captivating said cord holding means in said slot, said cord holding means comprising a construction having portions thereof intersecting at substantially a right angle, one of said intersecting portions being adapted to frictionally engage said power cord to thereby retain it in an extended position, the other of said intersecting portions being normally operable to effect disengagement of said cord and said one of said intersecting portions whereby said cord is free to return to its retracted position.

3. Structure as specified in claim 2, wherein said cord holding means is a substantially L-shaped member provided with an oval-shaped aperture in the vertical intersecting portion thereof for engagingly receiving said power cord.

4. Structure as specified in claim 3, wherein said substantially L-shaped member is provided with grooves coextensive with the junctures of said intersecting portions to thereby adapt said L-shaped member for pivotal movement in said slot.

5. Structure as specified in claim 1, including means for limiting movement of said L-shaped member.

6. In a vacuum cleaner having a housing and a power cord connected to a motor disposed in said housing and means for rewinding said power cord from an extended position, the improvement comprising: a removable wall providing access to the interior of said housing through an opening therein, said housing being provided with a slot in an edge thereof adjacent said opening, means cooperating with said rewinding means for releasably securing said power cord in at least one extended position, said means for releasably securing said power cord being insertable into said slot in a direction along the longitudinal axis thereof, said releasably securing means comprising means preventing withdrawal thereof in a direction perpendicular to said longitudinal axis, said releasably securing means being retained in said slot by said wall and means for securing said wall to said housing in registry with said opening.

7. For use with a household appliance having a hollow housing with a power cord and a cord reel for retracting the cord from an extended position, means for selectively retaining said power cord in at least one extended position, said means comprising a substantially L-shaped structure supported by one wall of said housing and having an opening therein for receiving said power cord, said L-shaped structure being provided with grooves coextensive with the junctures of the members forming said L-shaped structure for facilitating pivotal movement thereof with respect to said one wall, said L-shaped structure being adapted to be pivoted by said cord from a first position to a second position whereby said cord is held in an extended position, said L-shaped structure being manually movable from said second position to said first position to thereby release said cord for retraction by said cord reel.

References Cited

UNITED STATES PATENTS

| | | | |
|---|---|---|---|
| 2,338,385 | 1/1944 | Sorensen | 242—107.2 X |
| 2,794,513 | 6/1957 | Hultberg et al. | 15—323 X |
| 3,178,128 | 4/1965 | Meletti | 242—107.2 |

STANLEY N. GILREATH, *Primary Examiner.*

WILLIAM S. BURDEN, *Examiner.*